US012115106B1

(12) United States Patent
Alqahtani

(10) Patent No.: US 12,115,106 B1
(45) Date of Patent: Oct. 15, 2024

(54) AEROSOL BOX FOR PROTECTION DURING AEROSOL-GENERATING PROCEDURES

(71) Applicant: KING SAUD UNIVERSITY, Riyadh (SA)

(72) Inventor: Rakan M. Alqahtani, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/119,574

(22) Filed: Mar. 9, 2023

(51) Int. Cl.
*A61G 10/00* (2006.01)

(52) U.S. Cl.
CPC .................................. *A61G 10/005* (2013.01)

(58) Field of Classification Search
CPC ..... A61H 33/14; A61H 2033/141-148; A61M 21/0094; A62B 29/00; A62B 31/00; A61B 90/05; A61B 90/40; A61B 2090/401
See application file for complete search history.

(56) References Cited

U.S. PATENT DOCUMENTS

| | | | | |
|---|---|---|---|---|
| 5,728,041 | A | 3/1998 | Fowler, Jr. | |
| 6,461,290 | B1 | 10/2002 | Reichman et al. | |
| 6,971,985 | B2 | 12/2005 | Perlatti | |
| 7,503,890 | B2 | 3/2009 | Kubicsko et al. | |
| 2001/0029955 | A1 | 10/2001 | Paschal, Jr. et al. | |
| 2010/0168504 | A1* | 7/2010 | Castano, Sr. | A61M 21/0094 600/27 |
| 2015/0238264 | A1* | 8/2015 | Kerns | A61B 46/23 128/852 |
| 2021/0228300 | A1* | 7/2021 | DaCOSTA | A61B 6/107 |
| 2021/0307985 | A1* | 10/2021 | Staab | A61G 10/005 |
| 2023/0009815 | A1* | 1/2023 | Breegi | A61G 11/009 |

FOREIGN PATENT DOCUMENTS

| | | | | |
|---|---|---|---|---|
| CN | 100998534 A | | 7/2007 | |
| CN | 110339007 A | | 10/2019 | |
| CN | 209572734 U | * | 11/2019 | A01G 31/02 |
| CN | 111685953 A | * | 9/2020 | A61B 90/05 |
| DE | 202020102586 U1 | * | 6/2020 | |
| WO | WO-2021216611 A1 | * | 10/2021 | A61B 90/40 |
| WO | WO-2022182600 A1 | * | 9/2022 | |
| WO | WO-2022223679 A1 | * | 10/2022 | |

OTHER PUBLICATIONS

"Savion Isolation stretcher IS736"; printed on Oct. 13, 2020 from https://www.futurehealthconcepts.com/hospital-stretchers/savion-isolation-stretcher-is736.html.

* cited by examiner

*Primary Examiner* — Thaddeus B Cox
(74) *Attorney, Agent, or Firm* — Nath, Goldberg & Meyer; Joshua B. Goldberg

(57) ABSTRACT

The aerosol box for protection during aerosol-generating procedures is an enclosure for a patient's head and neck. The aerosol box includes a floor formed from at least one flexible sheet. The aerosol box further includes a top defining a central viewing window and a body sealed to the top and the floor. The body is configured as the frustum of a right, regular polygonal enclosure having a plurality of wall panels made of flexible resilient material and may be at least partially transparent. The wall panels are sealed to the top and floor, and one of the wall panels defines a patient entryway for introducing the patient's head and neck into the sealed enclosure. The wall panels include sleeve-and-glove assemblies extending into the enclosure for use by a primary health care worker and a plurality of assistants. The aerosol box is made of material impermeable to contaminants borne by aerosols.

12 Claims, 4 Drawing Sheets

AEROSOL BOX FOR PROTECTION DURING AEROSOL-GENERATING PROCEDURES

BACKGROUND

1. Field

The disclosure of the present patent application relates to aerosol boxes and medical glove boxes, and particularly to a an aerosol box for protection during aerosol-generating procedures that provides a pop-up structure for rapid deployment to provide a degree of protection for critical care health care workers from the spread of infectious disease, such as COVID-19.

2. Description of the Related Art

Aerosol boxes are items of medical equipment that may be used in intensive care units and similar environments. A typical aerosol box is conventionally made from acrylic, polycarbonate, or similar rigid, transparent material, and is sized to fit over a patient's head. Common aerosol boxes typically have two ports formed through one of the walls to allow a health care provider to easily access the patient for such procedures as intubation and the like. The purpose of the aerosol box is to protect the health care provider from aerosols and other forms of contaminated fluid exhaled and expelled from the patient, while still allowing access to the patient for procedures. Due to the rigid nature of a typical aerosol box, it cannot be easily stored or transported. Further, such aerosol boxes are typically rather limited in their dimensions and shapes, allowing only one health care provider to access the patient at a time.

Aerosol-generating procedures are medical procedures that may place health care workers a greater risk of exposure to higher concentrations of infectious respiratory aerosols than ordinary coughing, sneezing, talking, or breathing. While there is no definitive list of such procedures, the U.S. Center for Disease Control considers open suctioning of airway secretions, sputum induction, cardiopulmonary resuscitation, endotracheal intubation and extubation, non-invasive positive pressure ventilation, bronchoscopy, and manual or mechanical ventilation to be aerosol-generating procedures presenting an increased risk of exposure to SARS-CoV-2 and other infections. Other procedures that may also generate aerosols include nebulizer administration, high-flow oxygen delivery, tracheostomy, nasal endoscopy or endoscopic sinus surgery, flexible laryngoscopy, transsphenoidal surgeries, and nasogastric or nasojejunal tube placement.

In the experimental chemistry lab, a glove box is a sealed container having gloves extending inside the container accessible by ports built into the box so that the technician may manipulate objects inside the box without exposure to the surrounding atmosphere. Glove boxes are at least partially transparent so that the technician can see sufficiently to manipulate the object of material inside the box. Aerosol boxes typically have similar structure. Thus, an aerosol box for protection during aerosol-generating procedures solving the aforementioned problems is desired.

SUMMARY

The aerosol box for protection during aerosol-generating procedures is an enclosure with access for a patient's head, chest, and/or neck, providing protection for the patient's health care providers from infected fluids and aerosols exhaled and expelled from the patient. The aerosol box includes a floor formed from a double layer of flexible sheet, such as polypropylene of polyvinyl chloride (PVC) film, the floor having conduits extending diagonally between the double layers, ports at the edges of the floor for connection to ventilators or suction equipment or passing electrical cables, and valves or electrical connectors extending through the top layer for attachment to tubing for administering gas, such as oxygen or air, or removing fluids, such as respiratory secretions or sputum, or electrical connectors for attachment of monitors.

The body of the aerosol box has the shape of a right, regular hexagonal pyramid, including six wall panels shaped as isosceles trapezoids, the wall panels being made of flexible, resilient material, such as natural or synthetic rubber or other elastic material impermeable to fluid or particulate matter carried in aerosols that may be generated in the aerosol box. The material forming the floor and the top of the aerosol box are also impermeable to fluid or particulate matter carried in aerosols that may be generated in the aerosol box. The top of the aerosol box may be a spring wire frame in the shape of the frustum of a right, regular hexagonal pyramid having a transparent sheet of PVC material extending across the top base and sidewalls of the frame and that may have a central viewing window of rigid polycarbonate or other transparent polymer supported within the transparent PVC sheet. Legs of spring wire may extend from the vertices of the hexagonal top of the aerosol box and may be secured at their opposite end to the floor sheet, the legs being disposed within the body and extending along the seams between adjacent wall panels of the body so that the legs may be secured together by tie downs before use for compact storage and then resiliently expand to define the hexagonal, pyramidal shape of the body of the aerosol box for use.

The top of the aerosol box is sealed to the top edges of the wall panels of the body, and the bottom edges of the wall panels are sealed to the floor, so that the aerosol box is a sealed enclosure. Of the six wall panels of the body, one wall panel has a patient entry opening for inserting the patient's head, chest, and/or neck into the aerosol box, the patient opening including a combination of zipper flaps and inner and outer drapes secured by adhesive tape. A second wall panel includes a tool entry opening with a flap valve and isolation box. A third wall panel includes an elongated sleeve-and-glove pair for cardiopulmonary respiration. The remaining three wall panels include sleeve-and-gloves pairs, one panel for the main or principal heal care provider, the other two panels for assistants flanking the main provider on either side. The flexible, resilient material from which the wall panels are made provide for stretching the walls of the aerosol box when needed for cooperation in performing particular procedures without permanent deformation of the structure. The wall panels may be made completely or partially from transparent material to supplement the viewing window in the top of the aerosol box.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
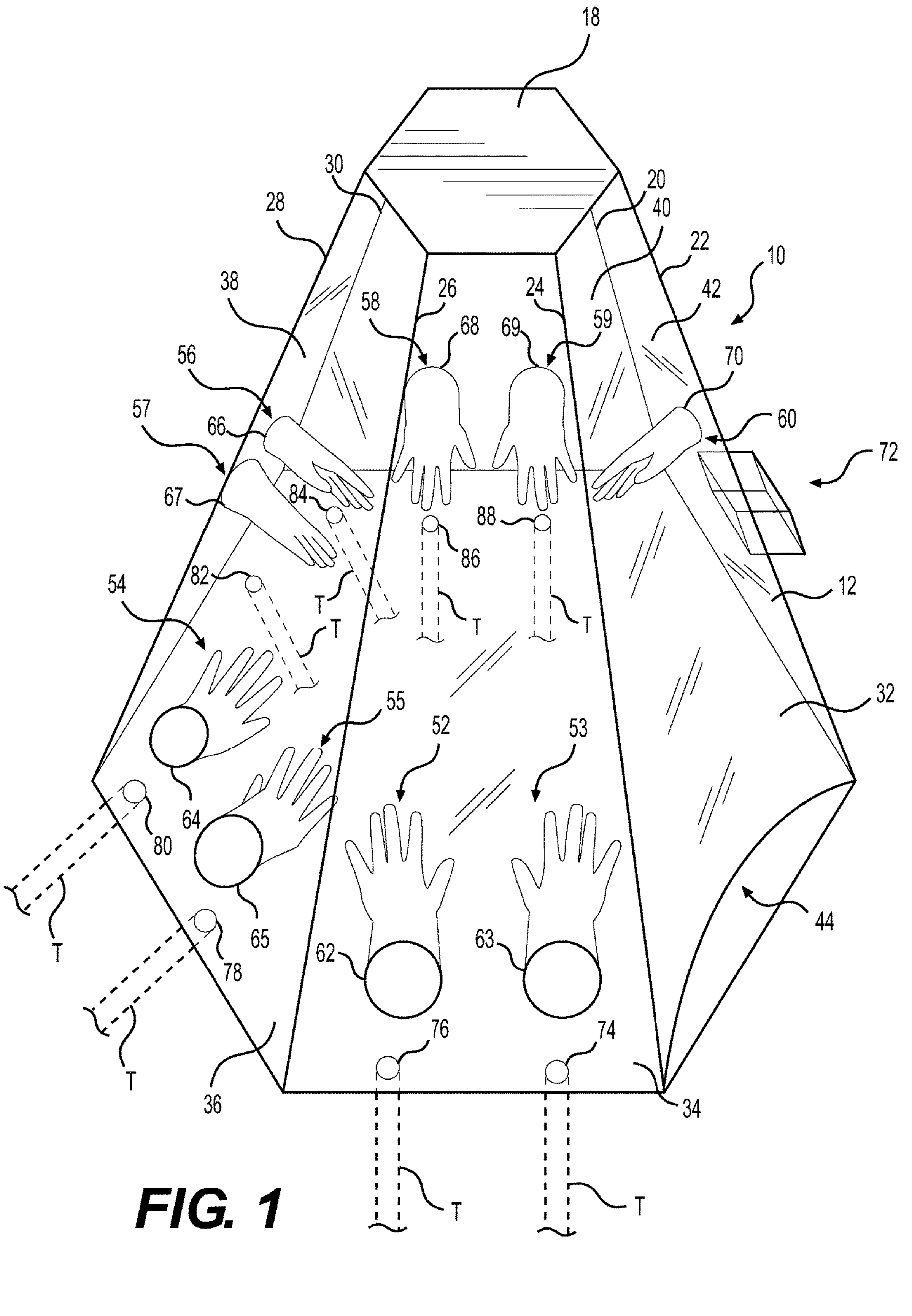
FIG. 1 is a perspective view of an aerosol box for protection during aerosol-generating procedures, shown in an expanded and deployed configuration.
Figure 2:
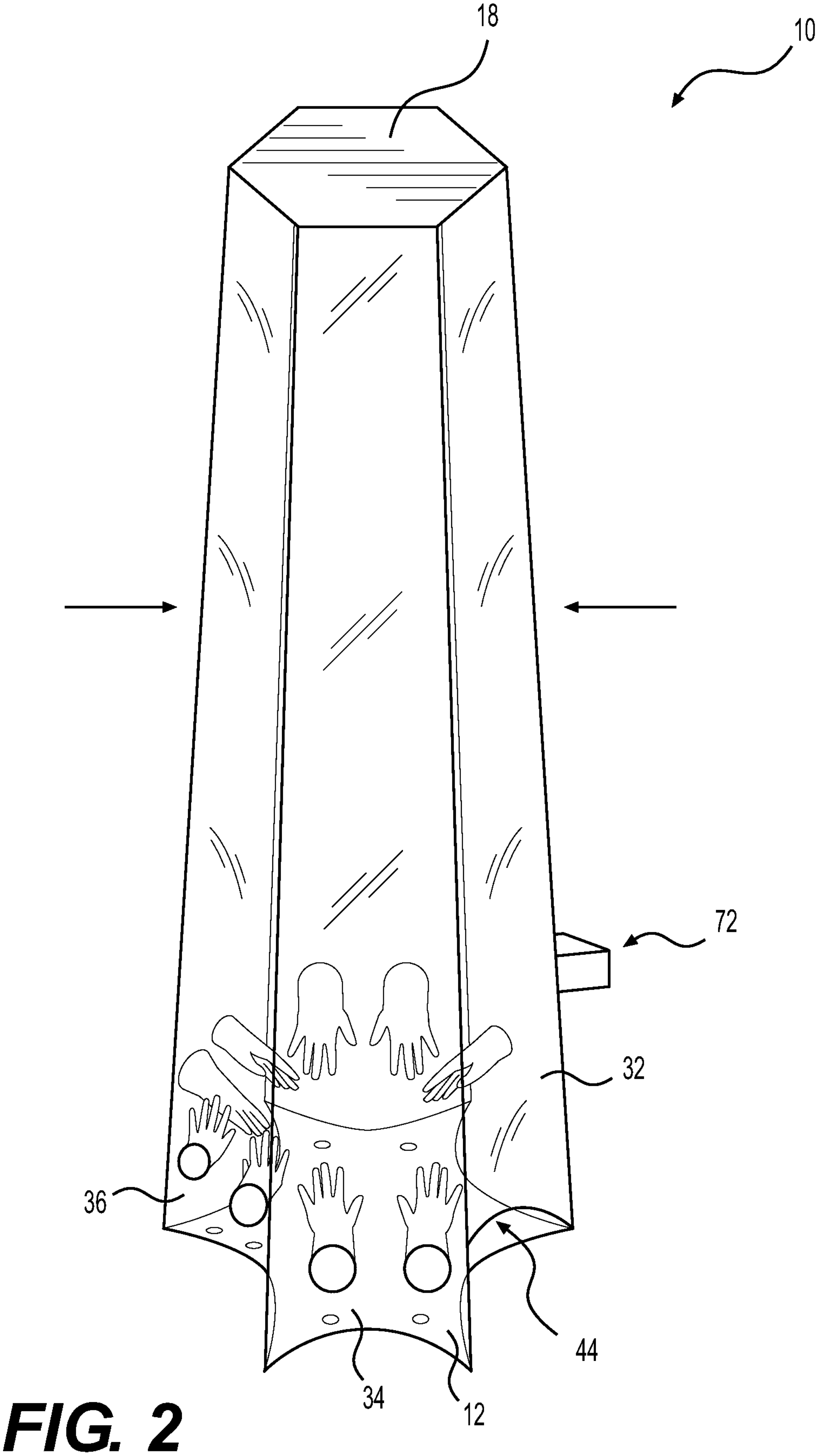
FIG. 2 is a perspective view of the aerosol box of FIG. 1, shown in a collapsed configuration.
Figure 3:
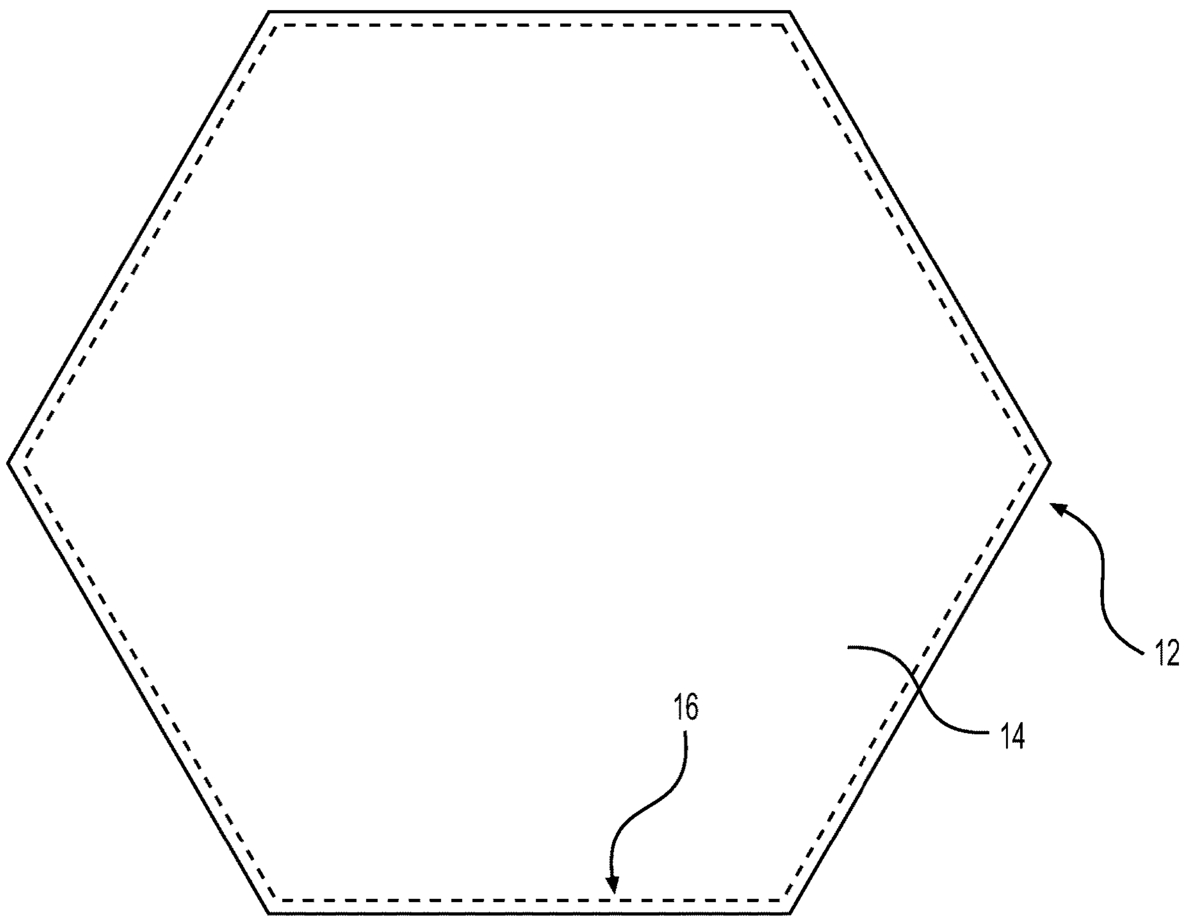
FIG. 3 is a plan view of a floor of the aerosol box of FIG. 1.

The aerosol box for protection during aerosol-generating procedures, designated generally as 10 in the drawings, is an enclosure for a patient's head, chest, and/or neck, providing protection for the patient's health care providers from infected fluids and aerosols exhaled and expelled from the patient. As shown in FIGS. 1-3, the aerosol box 10 includes a floor 12 formed from a flexible sheet 14 formed from a double layer of flexible sheet, such as polypropylene of polyvinyl chloride (PVC) film, and may have a hexagonal perimeter 16.

The aerosol box 10 has a top 18 that may be a spring wire frame in the shape of a right, regular hexagonal pyramid having a transparent sheet of PVC material extending across the frame. In some embodiments, the top 18 may have a central viewing window of rigid polycarbonate or other transparent polymer supported within the transparent PVC sheet.

The aerosol box 10 has a body having the shape of a right, regular hexagonal pyramid, including six wall panels 32, 34, 36, 38, 40, 42 shaped as isosceles trapezoids, the wall panels 32, 34, 36, 38, 40, 42 being made of flexible, resilient material, such as natural or synthetic rubber or other elastic material. The body may be supported by legs 20, 22, 24, 26, 28, 30 of spring wire (such as spring steel) extending from the vertices of the hexagonal top 18 of the aerosol box 10 and may be secured at their opposite end to the vertices of the floor sheet 12, the legs 20-30 being disposed within the body and extending through sleeves or loops along the seams between adjacent wall panels 32-42 of the body. The aerosol box 10 may initially be made with the legs 20-30 retracted in a configuration substantially parallel to each other, as shown in FIG. 2 and secured by ties for compact storage and transport so that when it is necessary to deploy the aerosol box 10 for treatment of a patient, the ties may be loosened so that the legs 20-30 resiliently pop outward in order to assume the hexagonal pyramid configuration of FIG. 1, stretching the floor 18 out to assume the hexagonal configuration of FIG. 3. The aerosol box 10 may remain deployed in the hexagonal pyramid configuration for performance of multiple procedures on a single patient, and then, since the wall panels 32-42 and the top 18 and floor 12 are made of disposable materials, the aerosol box 10 may be disposed of to prevent cross-contamination between patients from any infectious material that may be deposited and adhere to the surfaces inside the aerosol box 10.

It will be understood that the hexagonal pyramid configuration of FIGS. 1-3 is simply one exemplary configuration of the aerosol box 10, which may be provided in other configurations. For example, the body of the aerosol box 10 may have the configuration of the frustum of a right, regular hexagonal prism so that each of the wall panels 32-42 are rectangular, the spring wire legs 20-30 resiliently popping up normal to the floor 18 in a hexagonal configuration when the ties are loosened, after which the ties securing the wire frame of the top 18 of the aerosol box 10 may be loosened so that the top 18 assumes the configuration of the frustum of a hexagonal pyramid. In such an embodiment, the floor 18 need not be hexagonal, but may be rectangular and extend beyond the lower perimeter of the body of the aerosol box 10. It is further possible that the body of the aerosol box 10 may have polygonal configurations other than hexagonal, such as octagonal, provided that there is a sufficient number of wall panels spaced closely enough together to permit access by more than one assistant during the procedure and provided that the wall panels are made from flexible, resilient material to permit flexible cooperation between the health care workers, thereby avoiding the confining limitations of aerosol boxes made of rigid walls.

As shown in FIG. 1, one of the wall panels 32 has a flap 44 formed therein for receiving the patient's head. It should be understood that the overall size, shape and relative dimensions of the flap 44 are shown for exemplary purposes only, and that any suitable entryway for the patient's head and neck may be formed through one of the flexible side panels. Further, the flap 44 may be at least partially sealable using any suitable type of seal, such as zippers, adhesive tape, or other fasteners.

Further, at least one pair of gloves is secured to at least one of the flexible side panels. In the example of FIGS. 1 and 2, four of the six flexible side panels are provided with a pair of gloves. For example, in FIGS. 1 and 2, a pair of gloves 52, 53 are positioned within the enclosure of the aerosol box 10, the pair of gloves 52, 53 being in open communication with a corresponding pair of glove ports 62, 63 formed through the corresponding flexible side panel 34. Similarly, a pair of gloves 54, 55 are in open communication with a corresponding pair of glove ports 64, 65 formed through corresponding flexible side panel 36, a pair of gloves 56, 57 are in open communication with a corresponding pair of glove ports 66, 67 formed through corresponding flexible side panel 38, and a pair of gloves 58, 59 are in open communication with a corresponding pair of glove ports 68, 69 formed through corresponding flexible side panel 40. It should be understood that the four pairs of gloves, distributed across four adjacent flexible side panels, of FIGS. 1 and 2 are shown for exemplary purposes only, and that any suitable number, type, style or positioning of gloves may be used. Further, the gloves include sleeves extending into the box, and the gloves 52, 53 in the wall panel 34 adjacent the patient entryway 44 may have extended reach for performing cardiopulmonary resuscitation when necessary.

Additionally, as shown in FIG. 1, an access port 72 may be formed through one of the flexible side panels 42, allowing for the transfer of medical instruments and the like into and out of the collapsible aerosol box 10. It should be understood that access port 72 may be any suitable type of port, and is shown in FIGS. 1 and 2 for exemplary purposes only. Access port 72 may have any suitable type of covering, seal or the like, such as a negative pressure entryway and seal, for example. As best shown in FIG. 1, a single glove 60 is in open communication with a single glove port 70 formed through flexible side panel 42, adjacent the access port 72. This allows a health care provider to manipulate the tool or instrument once it is inserted through access port 72, and may also be used for additional purposes, such as closing a zipper inside the enclosure above the patient entryway.

Figure 4:
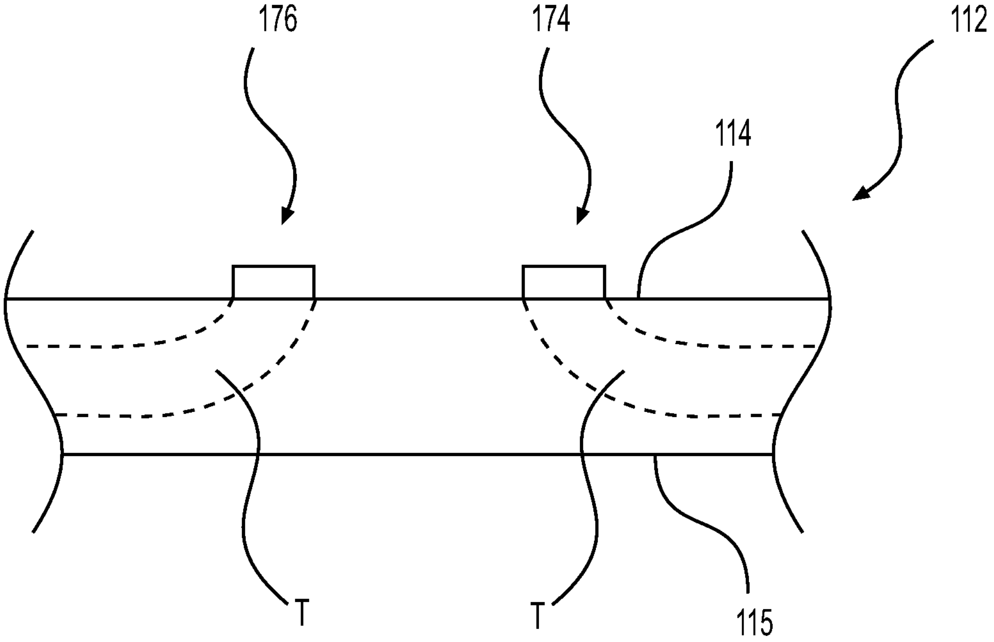
FIG. 4 is a partial side view in section though the floor of FIG. 3.

At least one fluid port 74, 76, 78, 80, 82, 84, 86, 88 may be formed through the floor 12 for connection to tubing T or the like for supplying the interior of the collapsible aerosol box 10 with oxygen, for removing fluids from the interior of the collapsible aerosol box 10, for connection to an air filtration unit, for ventilation circuit tubes, nasogastric tubes, cardiac leads, open suction tubes, etc. As shown in FIG. 4, rather than being formed as a single sheet floor, the collapsible floor 112 may be formed from an upper sheet 114 and a lower sheet 115, each being a flexible sheet, and defining an open interior region therebetween, allowing the tubing T to be run through the open interior region in order to protect the tubing T from snagging, knotting and the like. As shown, fluid ports 174, 176 (similar to the fluid ports of FIG. 1) or electrical connectors may be mounted in the upper sheet 114, providing access to the interior of the aerosol box 10. The ports 174, 176 may be used for connection of a negative pressure pump attached to the perimeter of the floor 12 through a HEPA filter, or for connection of leads to an EKG monitor, etc.

It is to be understood that the aerosol box for protection during aerosol-generating procedures is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. An aerosol box for protection during aerosol-generating procedures, comprising:

- a floor made from at least one flexible sheet; and
- a top having a frame made of spring wire defining a frustum of a right, regular polygonal pyramid, the frustum having a regular polygon top base and a regular polygon bottom base, the frame having transparent PVC extending across the top base, the top defining a central viewing window;
- wherein the aerosol box is configured as a right, regular polygonal enclosure having a plurality of wall panels joined together at seams, the wall panels comprising transparent PVC, the frame having a plurality of elongated legs, each of the legs having a top end and a bottom end, the top ends of the legs being attached to vertices of the regular polygon top base of the frustum and the bottom ends of the legs being attached to the floor, the legs extending inside the aerosol box along the seams between the wall panels to support the right, regular polygonal enclosure, the top, the floor, and the aerosol box being made of material impermeable to fluid or particulate matter carried in aerosols that may be generated in the aerosol box, the top and the floor being sealed to the wall panels to form a sealed enclosure, the plurality of wall panels including at least:
- a first wall panel having a patient entryway defined therein adapted for extending a patient's head and neck into the sealed enclosure;
- a second wall panel having a port defined therein adapted for introducing tools into the sealed enclosure; and
- third, fourth, and fifth wall panels each having a pair of sleeve-and-glove assemblies extending into the sealed enclosure for permitting a primary health care worker and two assistants to extend their hands into the sealed enclosure to perform procedures on the patient without exposing their hands to aerosols inside the sealed enclosure.

2. The aerosol box according to claim 1, wherein said floor comprises two flexible sheets including a top sheet and a bottom sheet, the floor having a perimeter and a plurality of conduits extending diagonally between the top sheet and the bottom sheet, the conduits being adapted for extending tubing and electrical cables from the perimeter to inside the sealed enclosure, the perimeter and the top sheet having ports for connection to gas delivery, suction, and electrical monitoring devices.

3. The aerosol box according to claim 1, wherein said floor is hexagonal and said aerosol box is configured as the frustum of a right, regular hexagonal pyramid.

4. The aerosol box according to claim 1, wherein said aerosol box is configured as a right, rectangular hexagonal prism.

5. The aerosol box according to claim 1, wherein said plurality of wall panels further includes a cardiopulmonary resuscitation panel having a pair of extended length sleeve-and-glove assemblies extending into the sealed enclosure for permitting administration of cardiopulmonary resuscitation to the patient.

6. The aerosol box according to claim 1, wherein the patient entryway includes flaps secured by releasable fasteners.

7. The aerosol box according to claim 6, wherein the fasteners comprise zippers.

8. The aerosol box according to claim 1, wherein the patient entryway includes drapes and adhesive tape for securing the drapes around the patient.

9. The aerosol box according to claim 1, wherein the spring wire defining the frame of the top of the aerosol box comprises spring steel.

10. The aerosol box according to claim 1, wherein each of the legs of said aerosol box is made of spring steel.

11. The aerosol box according to claim 1, wherein each of the legs of said aerosol box is configured to be retracted for compact storage and transport of the aerosol box before use, the legs being configured to be released to extend and pop open the aerosol box to deploy the aerosol box for use.

12. The aerosol box according to claim 1, wherein the aerosol box is disposable after use on a single patient to avoid cross-contamination by infections spread through aerosols generated inside the aerosol box.

* * * * *